(12) United States Patent
Yoshikane et al.

(10) Patent No.: US 9,625,340 B2
(45) Date of Patent: Apr. 18, 2017

(54) GAS PRESSURE TESTING DEVICE FOR A GAS COMPARTMENT PORTION OF A BAG

(71) Applicant: TOYO JIDOKI CO., LTD., Tokyo (JP)

(72) Inventors: Tohru Yoshikane, Iwakuni (JP); Shota Morishige, Iwakuni (JP)

(73) Assignee: TOYO JIDOKI CO., LTD., Tokyo (JP)

( * ) Notice: Subject to any disclaimer, the term of this patent is extended or adjusted under 35 U.S.C. 154(b) by 532 days.

(21) Appl. No.: 14/267,566

(22) Filed: May 1, 2014

(65) Prior Publication Data

US 2014/0325938 A1 Nov. 6, 2014

(30) Foreign Application Priority Data

May 2, 2013 (JP) ................................. 2013-097034

(51) Int. Cl.

| G01L 19/00 | (2006.01) |
|---|---|
| B65B 31/00 | (2006.01) |
| B65B 31/04 | (2006.01) |
| B65B 43/46 | (2006.01) |
| B65B 61/00 | (2006.01) |
| G01M 3/36 | (2006.01) |

(52) U.S. Cl.
CPC .............. *G01L 19/00* (2013.01); *B65B 31/00* (2013.01); *B65B 31/048* (2013.01); *B65B 43/465* (2013.01); *B65B 61/00* (2013.01); *G01M 3/363* (2013.01)

(58) Field of Classification Search
CPC ....... B65B 31/00; B65B 31/048; B65B 61/00; B65B 43/465; G01L 19/00; G01M 3/363

USPC ........................................... 73/41, 49.2, 49.3
See application file for complete search history.

(56) References Cited

U.S. PATENT DOCUMENTS

| 4,188,819 A | * | 2/1980 | Egee | ...................... G01M 3/366 |
| | | | | 73/45.4 |
| 4,510,730 A | * | 4/1985 | Edmondson | ............ G01M 3/36 |
| | | | | 209/602 |
| 4,706,494 A | * | 11/1987 | Creed | ...................... G01M 3/36 |
| | | | | 73/49.3 |

(Continued)

FOREIGN PATENT DOCUMENTS

| JP | P4771785 B | 9/2011 |
| JP | P5104073 B | 12/2012 |

*Primary Examiner* — Thanh Truong
*Assistant Examiner* — Thomas Wittenschlaeger
(74) *Attorney, Agent, or Firm* — Norton Rose Fulbright US LLP

(57) ABSTRACT

A gas pressure testing device, which is for checking pressure of gas inside the gas compartment portion of a bag, including: a pressing member (31) disposed on one side of the bag, a receiving member (38) positioned on another side of the bag, and a movable support member (39) having thereon the pressing member and a distance sensor (32). The pressing member being kept urged toward the gas compartment portion by air cylinder (44) is moved toward the bag so that the gas compartment portion is sandwiched by the pressing member and the receiving member. The distance sensor measures the distance (D) at such time to the pressing member and sends a distance signal to a control unit (37). Based on the distance signal, the control unit determines whether or not the gas pressure in the gas compartment portion is within a preset range.

10 Claims, 12 Drawing Sheets

(56) References Cited

U.S. PATENT DOCUMENTS

| | | | | |
|---|---|---|---|---|
| 4,862,732 A * | 9/1989 | Raymond | ............... | G01M 3/36 73/45.4 |
| 5,195,360 A * | 3/1993 | Knigge | ................. | G01M 3/36 73/49.3 |
| 6,330,823 B1 * | 12/2001 | Raymond | ........... | G01M 3/3218 73/41 |
| 7,584,650 B2 * | 9/2009 | Lehmann | ................ | G01M 3/36 73/45.4 |
| 2007/0089377 A1 * | 4/2007 | Yasuhira | ............... | B65B 43/465 53/403 |

* cited by examiner

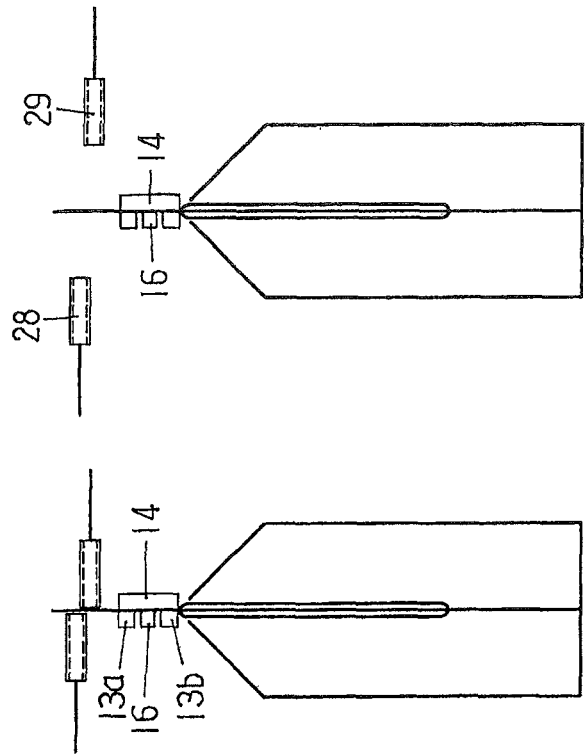

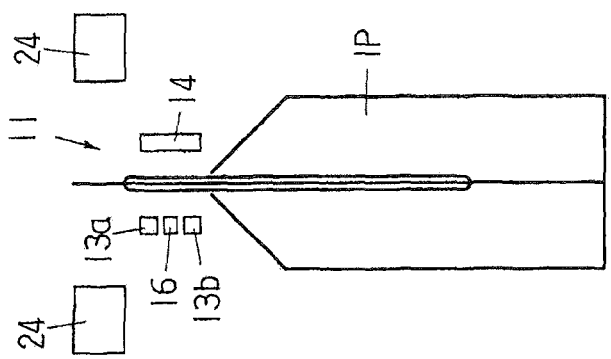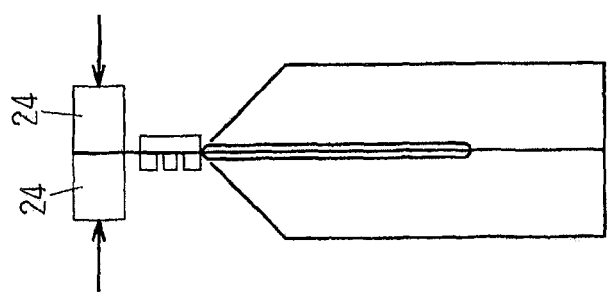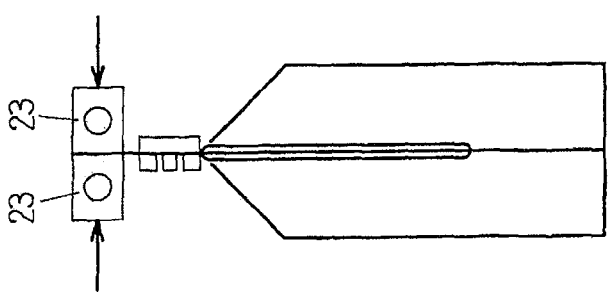

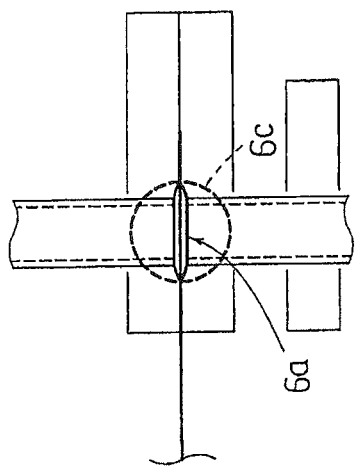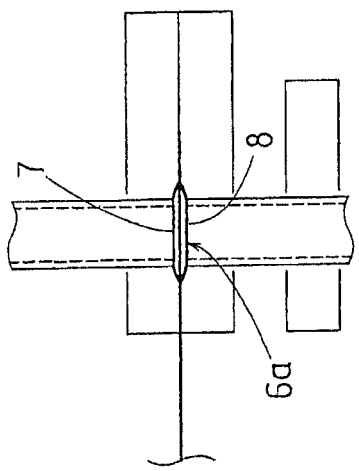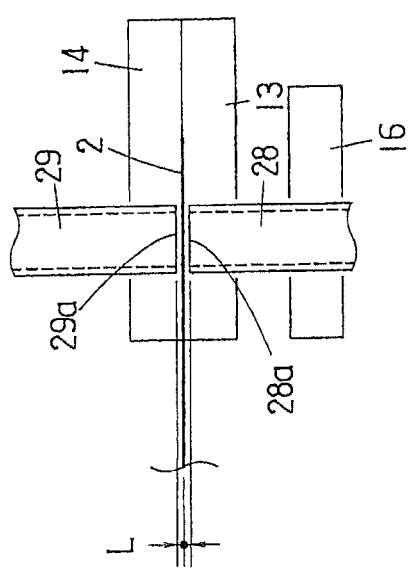

GAS PRESSURE TESTING DEVICE FOR A GAS COMPARTMENT PORTION OF A BAG

BACKGROUND OF THE INVENTION

1. Field of the Invention

The present invention relates to a gas pressure testing device used to check whether the pressure of gas encapsulated in a gas compartment portion of a bag is within a preset range or not.

2. Description of the Related Art

Japanese Patent No. 4,771,785 describes a rotary packaging apparatus that includes a gas charging apparatus. This rotary packaging apparatus is provided with multiple pairs of left and right bag-conveying grippers that intermittently convey bags, which are equipped with gas compartment portions, along a circular bag conveying path. Each pair of the grippers clamps or securely holds in between each one of the bags equipped with gas compartment portions at the top portion of the two lateral edges and conveyed the bag along the predetermined bag conveying path. While being conveyed, the bag is filled with a material to be packaged, and also gas is injected into its gas compartment portion. The mouth of the bag is subsequently sealed to enclose the packaged material inside the bag in an air-tight manner and simultaneously encapsulate gas in the gas compartment portion using the gas charging apparatus. A part of gas charging apparatus is disclosed in Japanese Patent No. 5,104,073 as well.

The gas compartment portion of a bag is formed in an integral manner in the lengthwise or longitudinal (height) direction of the bag between the sheets of film constituting the front and rear portions of an edge seal portion (fused portion) of the bag. The gas compartment portion is formed in such a seal portion so that the front and rear film sheets are not sealed (fused) together.

The gas compartment portion imparts shape retention properties and a self-supporting properties to the bag. Charging compressed air into the gas compartment portion can impart shape retention properties and a self-supporting capabilities to the bag. In addition, a gas compartment portion charged with compressed gas can be used, for example, as a handle for holding the bag during removal of packaged material from the bag.

Although not disclosed in Japanese Patent Nos. 4,771,785 and 5,104,073, the pressure of the gas charged in a gas compartment portion must be maintained within a predetermined range. In other words, when the pressure of the gas in a gas compartment portion is too low, it is impossible to accomplish the original purpose of the gas compartment portion that is to imparting the bag with shape retention properties and a self-supporting capabilities. Further, when the pressure of the gas charged is too low, then the gas compartment portion cannot be used as a handle. On the other hand, when the pressure of the gas charged in a gas compartment portion is too high, the pressure causes the sealed portion around the gas compartment portion (non-sealed portion) to delaminate, thereby degrading the appearance of the bag as a packaged product.

In order to keep the pressure of the gas charged into the gas compartment portion within a predetermined range, it is necessary to conduct numerous experiments in advance and precisely adjust various injection conditions, such as the pressure of the gas discharged from the nozzle of the gas charging apparatus, the spring rate of the compression spring (see the compression spring 18 of Japanese Patent No. 4,771,785), and the gap between the nozzle and the receiving member (see FIG. 5 of Japanese Patent No. 5,104,073). However, in actual operation, there are cases that some packaged products (defective articles) are produced, in which the pressure of the gas in the gas compartment portion deviates from the predetermined range.

On the other hand, it is believed that if the pressure of the gas in the gas compartment portion can be immediately tested for individual bags in an inline manner (on the same bag conveying path as the one used during the gas filling step and gas charging step), then such defective articles can be easily eliminated whenever they are produced; and, in addition, the generation of defective articles can be minimized by adjusting the conditions of the gas injection pressure as needed. However, such testing equipment is not available presently.

BRIEF SUMMARY OF THE INVENTION

The present invention is made in view of such a current state of the art described above in which gas testing equipment is not available, and it is an object of the invention to provide a gas pressure testing device capable of checking the pressure of gas charged in a gas compartment portion of individual bag in an inline manner.

The above object is accomplished by a unique structure of a gas pressure testing device of the present invention that is for checking pressure of gas charged in a gas compartment portion of a bag in which the gas compartment portion is formed integrally in the bag and extends in a longitudinal (height) direction in a sealed side edge portion of the bag, and the gas pressure testing device of the present invention is comprised of a measuring unit and a control unit.

The measuring unit of the gas pressure testing device is comprised of:
 a pressing member which is disposed on one side of a bag that is equipped with a gas compartment portion and suspended by a pair of grippers in such a manner that the grippers clamps the top portions of two lateral edges of the bag, the pressing member being movable forward and backward in the thickness direction of the bag so that it can apply pressure to the gas compartment portion when moved forward,
 a receiving member which is disposed on another side of the bag and is able to be positioned in a predetermined receiving position that is on the back side of the gas compartment portion of the bag,
 a support member which, on the rear side of the pressing member, supports the pressing member so as to move the pressing member in a forward-rearward direction and also to urge the pressing member forward direction,
 a drive source for moving the support member forward and rearward through a predetermined stroke, and
 a distance sensor which is disposed on the rear side of the pressing member and is moved forward and backward together with the support member by the drive source and measures the distance to the pressing member; and
 when the pressing member is moved forward by the support member, which is moved forward by the drive source, to sandwich the gas compartment portion between the pressing member and the receiving member that is positioned in the receiving position, the distance sensor measures the distance between the distance sensor and the pressing member.

The control unit of the gas pressure testing device determines whether or not the pressure of the gas that is filled in the gas compartment portion is within a range preset based on the signals from the distance sensor.

In the structure of the above-described gas pressure testing device, the present invention can further take the following manners:

(1) The support member can be comprised of a moving member, which is coupled to the drive source, and an air cylinder, which is provided on the moving member. The distance sensor is installed on the moving member, and the pressing member is installed on the piston rod of the air cylinder. In addition, in the air cylinder, compressed air under a predetermined pressure is introduced in a cylinder room that is provided on the side opposite from the piston rod.

(2) The receiving member is movable at predetermined timing between the receiving position (or bag receiving position) and a retracted position which is away from the bag (or away from a bag-conveying path).

(3) The control unit determines whether or not the pressure of the gas in the gas compartment portion of a bag is within the preset range based on whether or not the distance between the distance sensor and the pressing member is within a predetermined range.

(4) In the present invention, the gas pressure testing device can be installed as part of a gas charging apparatus. This gas charging apparatus is provided with a plurality of pairs of left and right bag-conveying grippers that clamp the top portions of two lateral edges of a bag and convey the bag intermittently along a predetermined bag conveying path, the bag being integrally formed therein with a gas compartment portion extending in the longitudinal direction in a side edge seal portion of the bag and having a gas inlet (incision or opening) that is formed in the film sheet constituting the gas introduction section of the gas compartment portion and places the exterior of the bag in communication with the interior of the gas compartment portion; and, during the process of intermittent convey of the bag along the bag conveying path, gas is injected into the gas compartment portion through the gas inlet and subsequently encapsulates gas in the gas compartment portion. The measuring unit of the gas pressure testing device is disposed in the vicinity of a predetermined stop position along the bag conveying path.

(5) Furthermore, in the present invention, the gas pressure testing device can be installed as part of a rotary packaging apparatus. This rotary packaging apparatus is provided with a plurality of pairs of left and right bag-conveying grippers that clamp top portions of two lateral edges of a bag and convey the bag intermittently along a circular bag conveying path, the bag being integrally formed therein with a gas compartment portion extending in the longitudinal direction in a side edge seal portion of the bag and having a gas inlet (incision or opening) that is formed in a film sheet constituting a gas introduction section of the gas compartment portion and places the exterior of the bag in communication with the interior of the gas compartment portion; and, during the process of intermittent convey of the bag along the bag conveying path, the bag is filled with the material to be packaged while gas is injected into the gas compartment portion through the gas inlet and subsequently encapsulated in the gas compartment portion. The measuring unit of the gas pressure testing device is disposed in the vicinity of a predetermined stop position along the bag conveying path.

The measuring unit of the gas pressure testing device of the present invention is compact; and with such a gas pressure testing device installed at predetermined stop position along the bag conveying path, it is possible to check the pressure of the gas charged in the gas compartment portion of individual bag in an in-line manner.

BRIEF DESCRIPTION OF THE SEVERAL VIEWS OF THE DRAWINGS

FIGS. 4(*a*) through 4(*d*) are side views showing a step-by-step explanation of the steps subsequent to the step of FIG. 3(*d*).

FIGS. 5(*a*) through 5(*c*) are side views showing a step-by-step explanation of the steps subsequent to the step of FIG. 4(*d*).

FIG. 12(*a*) through 12(*c*) are enlarged partial plan views illustrating the gas injection step in the rotary packaging apparatus of FIG. 2.

DETAILED DESCRIPTION OF THE INVENTION

The gas pressure testing device according to the present invention will be described below in detail with reference to FIGS. 1 through 12(*c*).

Figure 1:
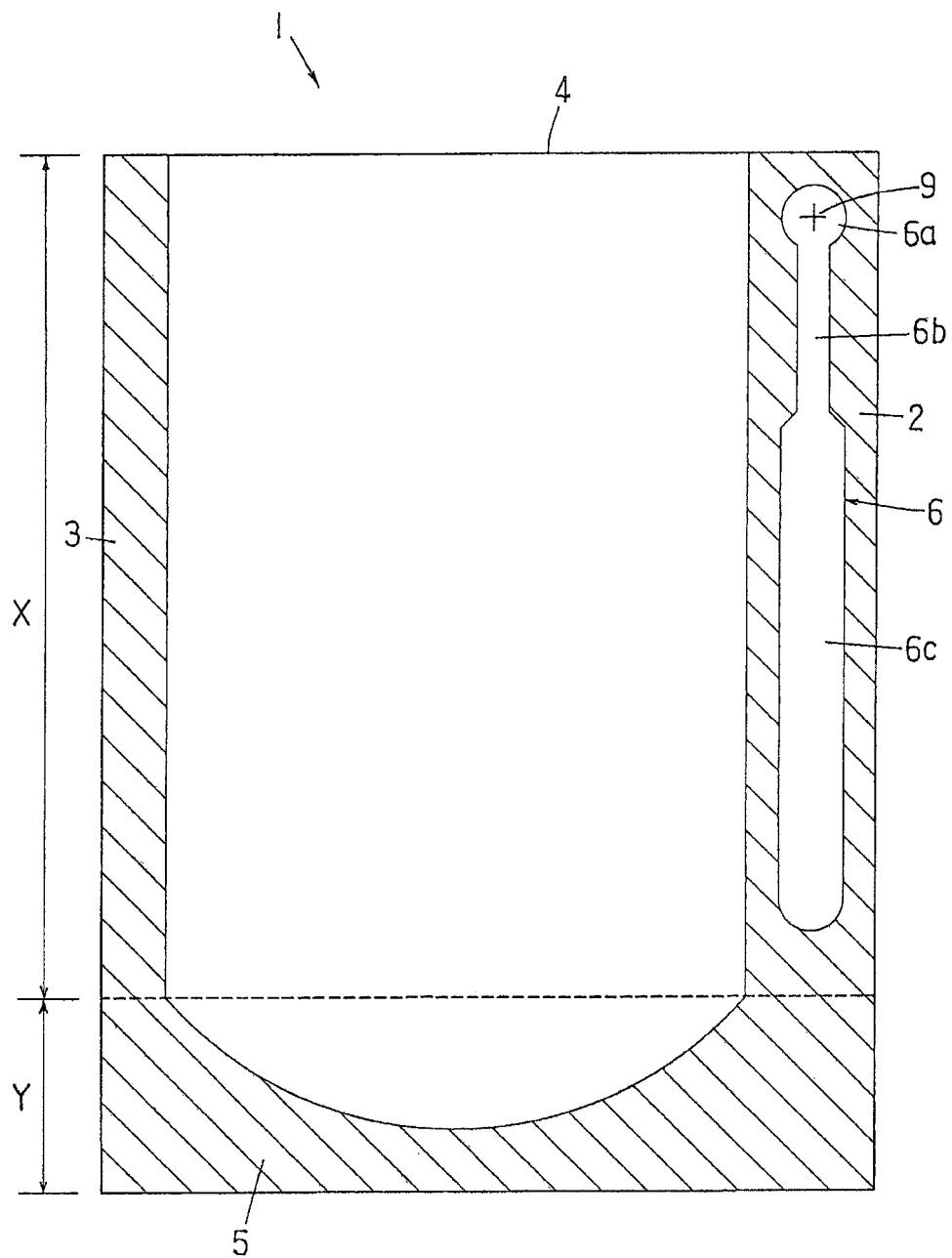
FIG. 1 is a front view of a bag equipped with a gas compartment portion used in the present invention.

First, FIG. 1 illustrates a bag 1 equipped with a gas compartment portion. The bag 1 is a bottom-gusseted self-supporting bag, and it is made up of front and rear film sheets, as well as a folded bottom film sheet. In the upper region X of the bag 1, the front and rear film sheets of the bag 1 are bonded together along the two lateral edges, thus forming seal portions 2, 3. Along the upper edge, the front and rear film sheets are not bonded together, creating a bag mouth 4. In the lower region Y of the bag 1, the front and rear film sheets are bonded along the two lateral edges, thereby sandwiching the film sheet of the bottom portion and, in addition, are bonded on the inside, where the film sheet of the bottom portion itself is folded inward. In the central portion, the front and rear film sheets are respectively bonded to the film sheet of the bottom portion (the two sheets of film of the bottom portion are not bonded), thereby forming a seal portion 5. The seal portions 2, 3, and 5 are indicated by oblique hatching in FIG. 1.

A non-fused portion (gas compartment portion) 6, in which the front and rear film sheets are not fused together, is formed in a part of the seal portion 2.

The gas compartment portion 6 is where no pressure is applied and sealing does not take place when the front and rear film sheets 7, 8 (see FIG. 12(b)) are heat-sealed (fused). The gas compartment portion 6 has a closed, elongated and narrow outline that extends downwardly, in the longitudinal or lengthwise direction, from the vicinity of the bag mouth 4 (upper edge of the seal portion 2), and it is formed with cross-shaped incisions 9 formed in the front and rear film sheets 7, 8 in the vicinity of the upper edge. The incisions (or gas inlets) 9 place the interior of the gas compartment portion 6 in communication with the exterior of the bag or the gas compartment portion 6. The gas compartment portion 6 comprises a round-shaped gas introduction section 6a, in which the incisions 9 are formed in the center, and an elongated neck section 6b that extends for a predetermined length from the gas introduction section 6a, and the gas compartment portion 6 further comprises a wide main section 6c under the neck section 6b.

The rotary packaging apparatus that fills the above-described bag 1, which is equipped with a gas compartment portion, with material to be packaged will be described next with reference to FIG. 2. This rotary packaging apparatus includes a gas charging apparatus and a gas pressure testing device.

Figure 2:
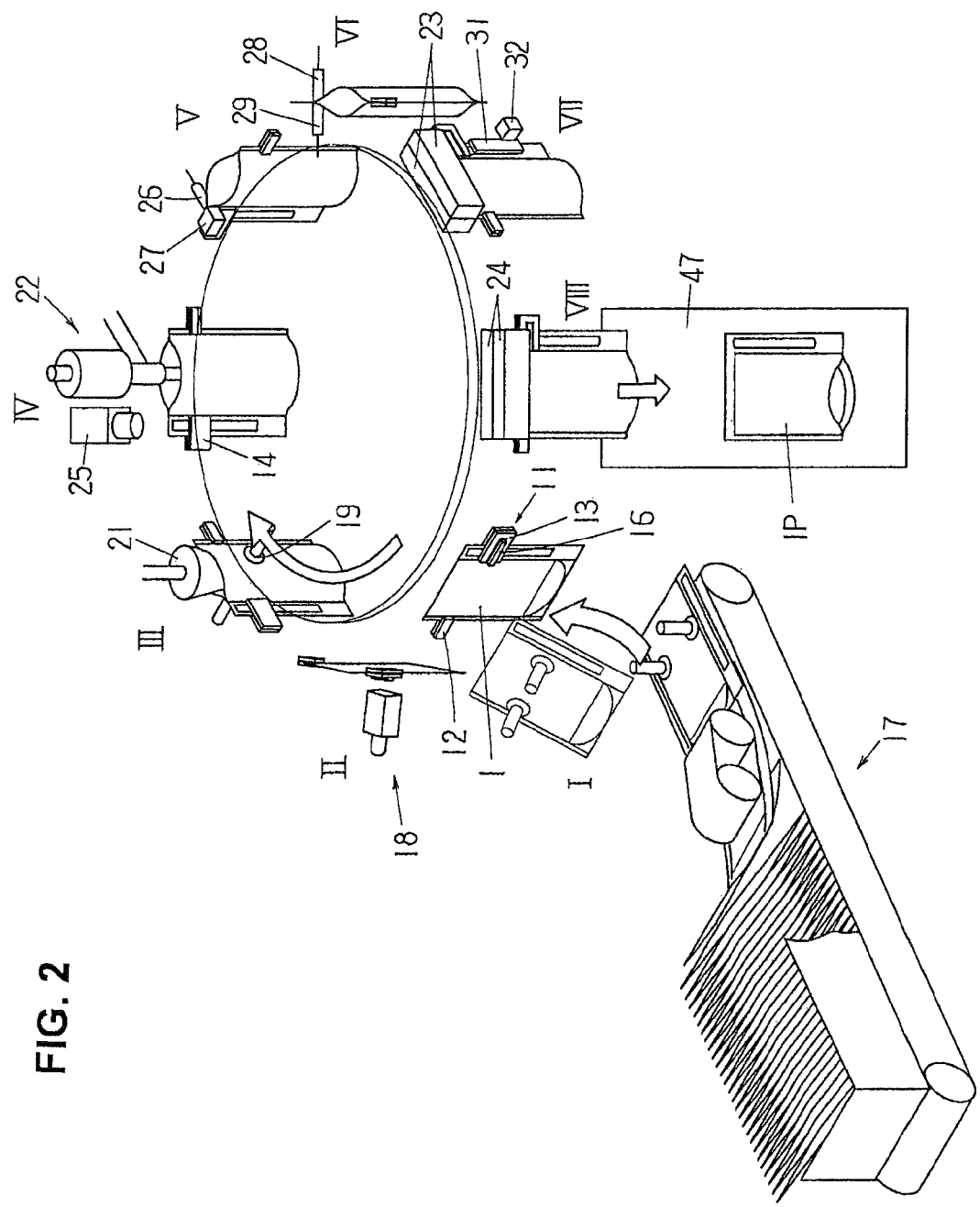
FIG. 2 is a schematic perspective view of a rotary packaging apparatus in which a gas pressure testing device according to the present invention is provided.

In the same manner as in the rotary packaging apparatus shown in FIG. 5 of Japanese Patent No. 4,771,785, the rotary packaging apparatus illustrated in the FIG. 2 is provided with a plurality of pairs of left and right bag-conveying grippers 11, 12 installed at regular intervals around an intermittently rotating table, so that the grippers clamp the top portion of the two lateral top edge areas of each of the supplied bag 1 equipped gas compartment portion in a suspended state while intermittently conveying the bag as the table intermittently rotates, thus conveying the bag 1 along a circular bag conveying path. Subsequent to supplying the bag 1 to the grippers 11, 12, in each of the stop positions (or gripper stop positions) I through VIII, at which the grippers 11, 12 come to a stop, the bag 1 having the gas compartment portion and clamped by the grippers 11, 12 is subjected to successive packaging operations, such as opening the mouth of the bag, filling it with the material to be packaged, and sealing the mouth of the bag, as well as operations involving the filling of the gas compartment portion 6 with gas and encapsulating the gas therein using the gas charging apparatus. In addition, the operation of testing the pressure of the gas filled in the gas compartment portion 6 is carried out using the gas pressure testing device.

Figure 10:
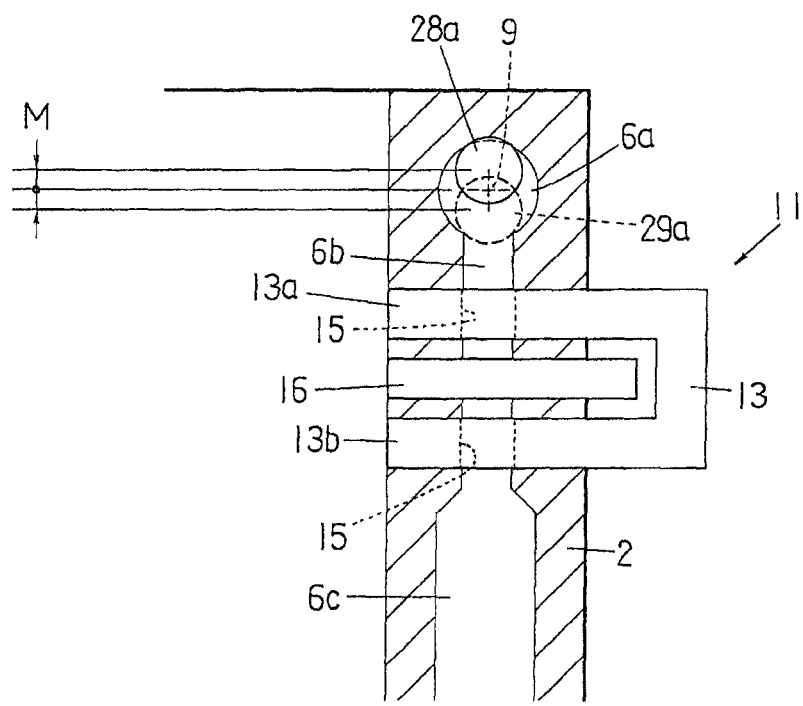
FIG. 10 is an enlarged partial front view of the construction and functions of the bag-conveying grippers of the rotary packaging apparatus of FIG. 2.
Figure 11:
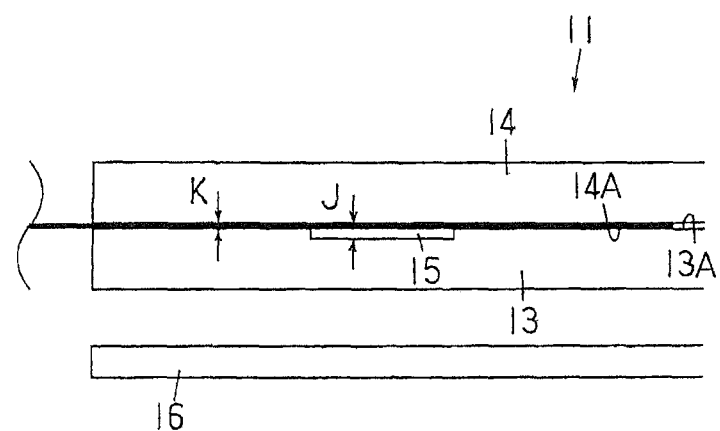
FIG. 11 is an enlarged partial cross-sectional view of the bag-conveying grippers.

One gripper 11 of the pair of grippers 11, 12 is comprised of a pair of gripping elements 13, 14. When viewed from the front, the shape of the outer gripping element 13 appears to look substantially like a letter U turned on its side (see FIG. 10), and on the other hand, when viewed from the front, the inner gripping element 14 appears to look substantially quadrangular (see FIG. 2), with its outline substantially matching the external shape of the gripping element 13. The gripper 11 uses the gripping element 14 and the top and bottom transverse portions 13a, 13b of the gripping element 13 to clamp or securely hold the front and rear sides of the edge seal portion 2, in which the gas compartment portion 6 is formed. As shown in FIGS. 10 and 11, shallow grooves 15 extending in the vertical direction are formed in the gripping surfaces 13A of the top and bottom transverse portions 13a, 13b of the gripping element 13. The gripping surface 14A of the gripping element 14, on the other hand, has no grooves etc. formed and is substantially flat. The area of the bag that is clamped by the bag-conveying gripper 11 (gripping elements 13, 14) is in the vicinity of the gas introduction section 6a of the gas compartment portion 6 formed in the seal portion 2 in such a manner that the top and bottom transverse portions 13a, 13b of the gripping element 13, along with the gripping element 14, clamp the neck section 6b in a horizontally spanning configuration. Thus, when closed, the bag-conveying gripper 11 is in a position that the grooves 15 hold the neck section 6b, and gap J (see FIG. 11) between the two opposed faces of the gripping elements 13, 14 in the neck section 6b is wider than the thickness K of the front and rear film sheets of the gas compartment portion 6 by the depth of the grooves 15. In other words, even when the bag-conveying gripper 11 is closed, the gripping elements 13, 14 hold the neck section 6b with a predetermined gap J therebetween, and it is not that they clamp only the neck section 6b.

The other edge seal portion 3 of the bag 1 is held by a regular bag-conveying gripper 12 (same as the gripper 8 of Japanese Patent No. 4,771,785).

Figure 3A:
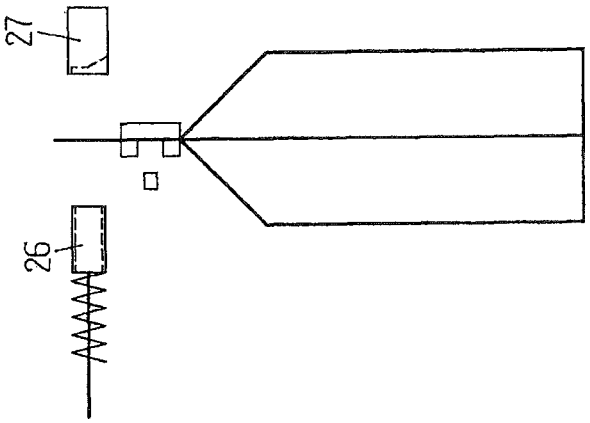
FIGS. 3(*a*) through 3(*d*) are side views showing a step-by-step explanation of a gas charging method carried out by the rotary packaging apparatus of FIG. 2.

As seen from FIG. 3(a), for each pair of grippers 11, 12, a gas blocking gripper 16 is provided so as to face the gripping element 14. The gas blocking gripper 16 moves together with the grippers 11, 12 and is opened and closed at predetermined timing. When the gas blocking gripper 16 is closed, the gas blocking gripper 16 enters the space between the top and bottom transverse portions 13a, 13b of the gripping element 13 and clamps the neck section 6b of the gas compartment portion 6 of the bag from the front and rear side between itself and the gripping element 14. In the present invention, the area of the neck section 6b that is clamped by the gas blocking gripper 16 is referred to as a "blockage region".

In the above-described rotary packaging apparatus, as shown in FIG. 2, a conveyer magazine type bag-supplying device 17 is disposed in stop position I of the bag conveying path, a printer (only a head section 18 thereof is shown) is disposed in stop position II, a mouth-opening device (only suction cups 19 and an opening head 21 thereof are shown) is disposed in stop position III, a filling device (only a nozzle section 22 thereof is shown) is disposed in stop position IV, a sealing device (only a pair of hot plates 23, 23 thereof are shown) is disposed in stop position VII, and a cooling device (only a pair of cooling plates 24, 24 thereof are shown) is disposed in stop position VIII. Furthermore, as part of the gas charging apparatus, a pre-heating device (only a heated gas-blowing nozzle 25 thereof is shown) is disposed in stop position IV, a preliminary gas injection device (only a preliminary gas injection nozzle 26 and a receiving member 27 thereof are shown) is disposed in stop position V, and a gas injection device (only a pair of gas injection nozzles 28 and 29 thereof are shown) is disposed in stop position VI. Furthermore, as part of the gas pressure testing device, a measuring unit (only a pressing member 31 and a distance sensor 32 thereof are shown) is disposed in stop position VII.

The packaging method that, for bags 1 equipped with gas compartment portion illustrated in FIG. 1, uses the rotary packaging apparatus illustrated in FIG. 2 (including the gas charging apparatus and the gas pressure testing device) is carried out in the following manner:

(1) In stop position I (bag-supplying station), a bag 1 equipped with a gas compartment portion is supplied by the grippers 11, 12 from the conveyer magazine type bag-supplying device 17, and the grippers 11, 12 clamp the front and rear sides of predetermined locations in the seal portions 2, 3 of the bag. When the bag is thus clamped, the neck section 6b of the gas compartment portion 6 of the bag is clamped by the gripper 11. This state is illustrated in FIG. 3(a) and FIGS. 10 and 11. At such time, the gas blocking gripper 16 is open. As shown in FIG. 11, the gap J is formed to match the groove 15 between the gripping surfaces 13A, 14A of the gripping elements 13, 14 that clamp the neck section 6b of the gas compartment portion 6.

(2) In stop position II (printing station), lettering is printed on the surface of the bag using the printer.

(3) In stop position III (mouth opening station), the mouth of the bag is opened by the mouth-opening device. The two suction cups 19 of the mouth-opening device are extended towards or retracted from the bag 1 equipped with gas compartment portion. When the suction cups 19 are extended, they adhere to both sides of the bag 1, and then when they are retracted, the mouth of the bag is opened as a result. The mouth-opening head 21 is moved up and down above the bag 1; and when it moved down, its lower end enters the bag through the opened mouth of the bag and discharges air into the bag.

Figure 8:
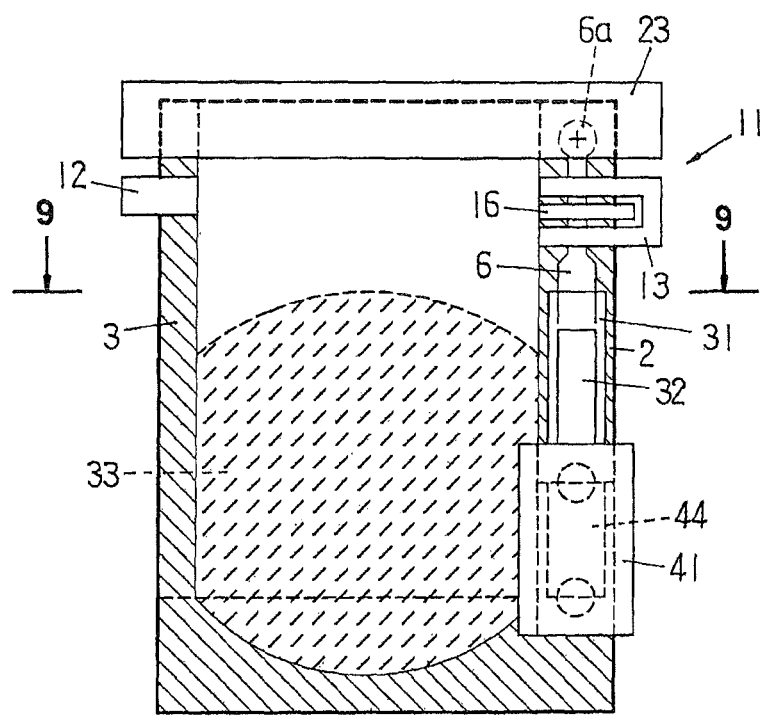
FIG. 8 is a front view of a part of the gas pressure testing device (showing the main portion only) according to the present invention.
Figure 9:
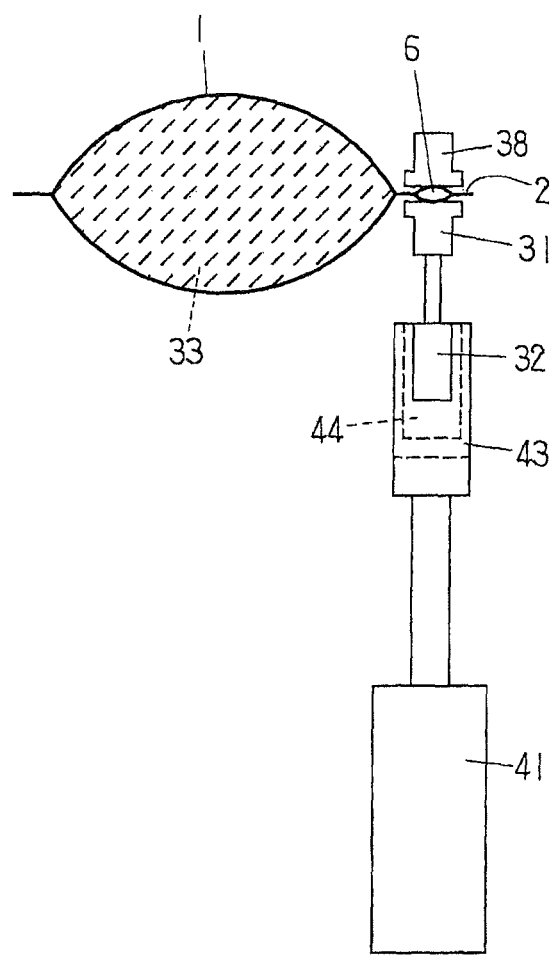
FIG. 9 is a cross-sectional view taken along the line 9-9 in FIG. 8.

(4) In stop position IV (packaged material filling station and pre-heating station), the bag is filled with, for instance, a liquid substance using the filling device (see the filled material 33 in FIG. 8). The nozzle portion 22 of the filling device moves up and down above the bag 1, and when it moves down, the nozzle portion 22 goes into the bag through the mouth of the bag and fills the bag with the liquid substance.

In addition, in this stop position IV, a heated gas-blowing nozzle 25, which forms part of the pre-heating device, is installed. The heated gas-blowing nozzle 25 is in the vicinity of the bag conveying path of the bag 1 equipped with gas compartment portion, and a pre-heating step is carried out thereby to heat the gas compartment portion 6 of the bag 1. The heated gas-blowing nozzle 25 is connected to a fan and a heating source (both not shown), and its blow opening is directed at the gas compartment portion 6 of the bag 1 that comes to a stop in stop position IV. The heated gas-blowing nozzle 25 discharges hot air (heated gas) from the blow opening to the gas compartment portion 6 and heats the gas compartment portion 6 of the bag 1, which is made mostly (or entirely) of thermoplastic resin film, thereby softening the film sheet that forms the gas compartment portion 6.

(5) In stop position V (preliminary gas injection station), a preliminary gas injection nozzle 26 and a receiving member 27, both of which forming part of the preliminary gas injection device, are installed in the vicinity of the bag conveying path of the bag 1, and a preliminary gas injection step, during which gas is blown into the gas compartment portion 6 of the bag 1, is carried out. The preliminary gas injection nozzle 26, which is connected to a pressurized gas supply source through a diverter valve and the like, not shown, reciprocates in a direction normal to the surface of the bag 1 between its standby position and its extended position, and the discharge outlet 26a at the distal end of the preliminary gas injection nozzle 26 is aligned with the incision 9 of the bag in the extended position. The receiving member 27 is disposed opposite the nozzle 26 so as to have the bag 1 in between, and it reciprocates in the same direction as but opposite to that of the nozzle 26 between its standby position and its extended position and supports the rear side of the bag 1 while facing the discharge outlet 26a of the nozzle 26 in the extended position. In the distal end of the receiving member 27, a recessed portion 27a is formed. The nozzle 26 is biased or urged forward by a compression spring 34.

Figure 3B:
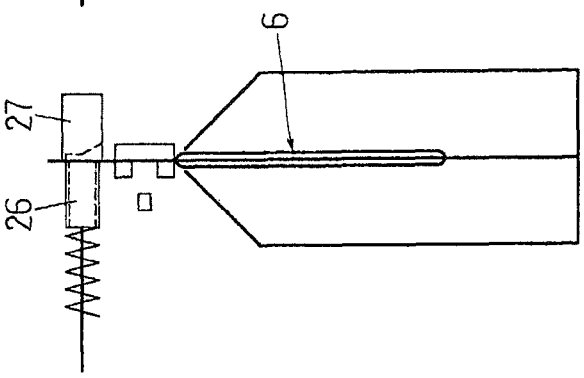
Figure 3C:
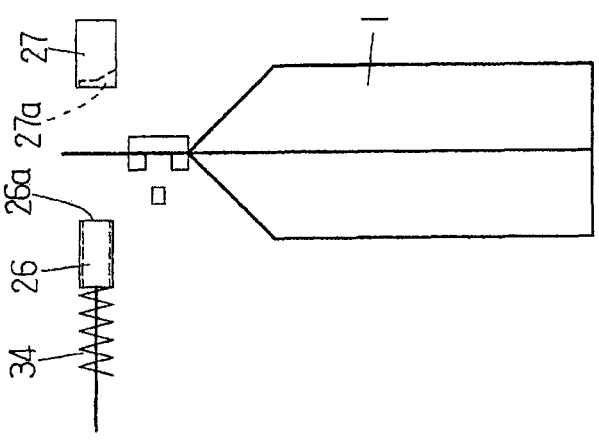

As shown in FIG. 3(b), when the bag 1 comes to a stop in stop position V, the preliminary gas injection nozzle 26 and the receiving member 27 are retracted and remain in their standby position. Subsequently, as shown in FIG. 3(c), the preliminary gas injection nozzle 26 and the receiving member 27 are moved forward in synchronism towards the forward position, such that the discharge outlet 26a at the distal end of the preliminary gas injection nozzle 26 abuts the gas introduction section 6a while the receiving member 27 abuts the gas introduction section 6a on its rear side. Then immediately thereafter, compressed gas is discharged from the distal end of the preliminary gas injection nozzle 26 and injected into the gas compartment portion 6 through the incision 9. Since, as discussed above, the neck section 6b of the gas compartment portion 6 is not clamped by the gripping elements 13, 14 of the bag-conveying gripper 11 and is only held thereby with the gap J provided in between, the gas can be also channeled to the lower main section 6c also through the neck section 6b.

During the injection of the gas, under the action of air pressure, the preliminary gas injection nozzle 26 is slightly retracted against the bias of the compression spring 34. As a result, the gas introduction section 6a of the gas compartment portion 6 of the bag 1 expands to create a space between the front and rear film sheets 7, 8 that form the gas introduction section 6a, and the gas is blown into the gas compartment portion 6 through the incision 9 that is on the preliminary gas injection nozzle 26 side. During this process, the receiving member 27 supports the rear side of the bag 1. Since the recessed portion 27a is formed in the distal end of the receiving member 27, the gas introduction section 6a also expands on the rear side (the receiving member 27 side), thereby enhancing the influx of gas through the incision 9 proximate to the preliminary gas injection nozzle 26.

In this preliminary gas injection step, the compressed gas entering the gas introduction section 6a of the gas compartment portion 6 through the incision 9 enters the main section 6c through the neck section 6b and causes the entire gas compartment portion 6 to expand or inflate.

In some cases, the front and rear film sheets 7, 8 constituting the gas compartment portion 6 may be entirely or partially firmly adhered to each other under the action of static electricity and the like. In such a case, the compressed gas discharged from the preliminary gas injection nozzle 26 enters the gas introduction section 6a of the gas compartment portion 6 through the incision 9, separates and spreads apart the adhered front and rear film sheets 7, 8, and causes the gas introduction section 6a to expand. Subsequently, the compressed gas enters the neck section 6b and separates and spreads apart the similarly adhered front and rear film sheets 7, 8 thereof and causes the neck section 6b to expand, and it furthermore enters the main section 6c, separates and spreads apart the likewise adhered front and rear film sheets 7, 8 thereof and causes the main section 6c to expand. The compressed gas thus weakens the adhesion of the front and rear film sheets 7, 8 in the entire of or most of the gas compartment portion 6. Softening the film sheets 7, 8 of the gas compartment portion 6 in the previous pre-heating step thus helps weaken the state of adhesion.

Figure 3D:
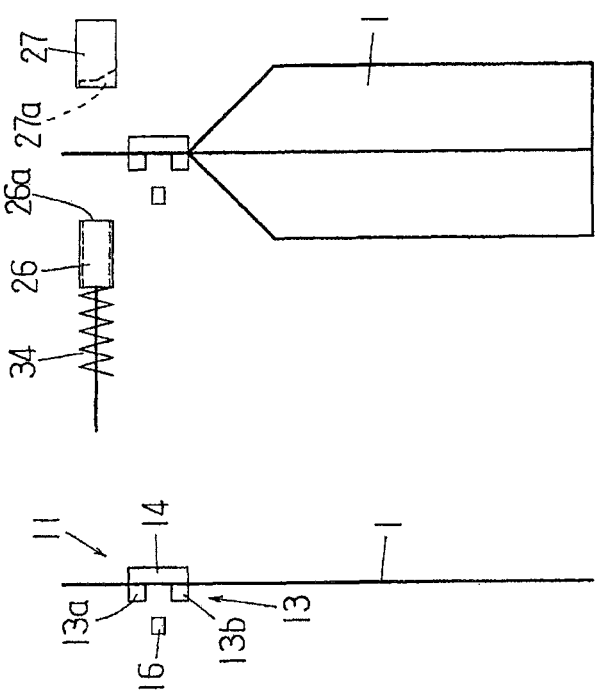

Subsequently, as shown in FIG. 3(d), when the preliminary gas injection nozzle 26 and the receiving member 27 are retracted, and the injection of the compressed gas is stopped, the gas injected into the gas compartment portion 6 immediately escapes therefrom through the incision 9, and the previously expanded (inflated) gas compartment portion 6 shrinks and becomes as flat as before. The bag 1 in this state is then conveyed to the next stop position VI.

(6) In stop position VI (gas filling station), as seen from as FIG. 4(a) gas injection nozzles 28, 29 that form part of the gas injection device are installed in the vicinity of the bag conveying path of the bag 1 equipped with gas compartment portion, and the gas filling step is carried out for the bag by injecting gas into the gas compartment portion 6 of the bag 1 by the gas injection nozzles 28, 29 and then by blocking fluid communication of gas between the gas introduction section 6a (incision 9) and the interior of the gas compartment portion 6 by the gas blocking gripper 16.

The gas injection nozzles 28, 29 are connected to a pressurized gas supply source through a change valve and the like, not shown; and when the discharge outlets 28a and 29a at the distal ends thereof are oriented perpendicularly to the gas introduction section 6a of the gas compartment portion 6 of the bag, the nozzles 28, 29 reciprocate between their standby position and their extended position in mutually opposite directions perpendicularly to the bag 1. In the extended or forward-end positions, the discharge outlets 28a, 29a of the gas injection nozzles 28, 29 are aligned with the gas introduction section 6a on both sides of the bag 1. The direction of gas discharge is perpendicular to the bag 1.

As shown in FIG. 4(a), when the bag 1 is conveyed to and stops in stop position VI, the gas injection nozzles 28, 29 are retracted and remain in their standby position. Subsequently, as shown in FIG. 4(b), both gas injection nozzles 28, 29 are extended or moved forward and set in the extended or forward-end positions, so that the discharge outlets 28a, 29a of the gas injection nozzles 28, 29 that are at their distal ends are aligned with the gas introduction section 6a.

In the above process, as shown in FIG. 12(a), a predetermined gap L, which is slightly greater (wider) than the thickness of the two film sheets 7, 8 of the bag, is left between the two discharge outlets 28a, 29a of the gas injection nozzles 28, 29, and this gap L does not change until the gas injection nozzles 28, 29 are retracted from their extended or forward-end positions. As a result of this gap L between the two discharge outlets 28a, 29a, during the gas discharge, the gas introduction section 6a of the gas compartment portion 6 of the bag expands, a gap is formed between the film sheets 7, 8, and the gas can enter the gas compartment portion 6 (or enter the neck section 6b and main section 6c) through this gap.

As shown in FIG. 10, the inner diameter of the discharge outlets 28a, 29a of the gas injection nozzles 28, 29 is set to be smaller than the diameter of the gas introduction section 6a in which the incisions 9 are formed. In this manner, with the inner diameter of the discharge outlets 28a, 29a made smaller than the diameter of the gas introduction section 6a (or its width if the gas introduction section is not round), in which the incisions 9 are formed, it is possible to make the flow of gas discharged from the gas injection nozzles 28, 29 concentrated in the gas introduction section 6a, and gas injection can be made in a more efficient manner.

In addition, it is so arranged that when the gas injection nozzles 28, 29 are positioned in their extended or forward-end positions, the centers of the discharge outlets 28a, 29a are offset from the centers of the incisions 9 by equal distances, with a total gap of M. As a result of this arrangement, it is possible to prevent problems from arising during gas injection even when the elevation of the bag 1 gripped by the grippers 11, 12 slightly deviates from the originally set position (the position illustrated in FIG. 10) in the vertical direction, and even when the position, in which the incisions 9 are formed, slightly deviates from the center of the gas introduction section 6a in the vertical direction.

When the gas injection nozzles 28, 29 in their extended or forward position initiate gas injection, compressed gas is injected through the incisions 9 formed in the two film sheets 7, 8 into the gas introduction section 6a of the gas compartment portion 6 of the bag, and, as shown in FIG. 12(b), the gas introduction section 6a expands and the film sheets 7, 8 adhere to the discharge outlets 28a, 29a of the nozzles 28, 29. In other words, the gap L between the discharge outlets 28a, 29a of the nozzles 28, 29 positioned in the extended positions is set to dimensions sufficient for the film sheets 7, 8 of the expanded gas introduction section 6a to closely adhere to the discharge outlets 28a, 29a. When the gas introduction section 6a expands, a gap is formed between the film sheets 7, 8 of the gas introduction section 6a, after which compressed gas enters the neck section 6b and then the main section 6c, and the entire gas compartment portion 6 expands as shown in FIG. 12(c). Since the state of adhesion of the film sheets 7, 8 of the gas compartment portion 6 has already been weakened in the preliminary gas injection step, the gas injection and the filling of the gas compartment portion 6 with gas in this gas filling step are accomplished in a problem-free and smooth manner.

Subsequently, as shown in FIG. 4(c), the gas blocking gripper 16 closes and clamps, in conjunction with the gripping element 14, the blockage region configured between the transverse portions 13a, 13b of the gripping element 13 on both sides. As a result, the blockage region is completely compressed, and the fluid communication of gas between the gas introduction section 6a (incisions 9) and the interior of the gas compartment portion 6 is blocked. Thereafter, as shown in FIG. 4(d), the gas injection nozzles 28, 29 are retracted, and the bag 1 is conveyed to the next stop position VII while being maintained in the blocked state made by the gas blocking gripper 16 and the gripping element 14.

(7) In stop position VII (mouth-sealing station, gas charging station, and gas pressure testing station), a pair of hot plates 23, 23 forming part of the sealing device are disposed in the vicinity of the bag conveying path of the bag 1 equipped with a gas compartment portion, and the gas charging step, which involves sealing the gas introduction section 6a of the bag 1, is carried out, and simultaneously a mouth-sealing step, which involves sealing the mouth of the bag 1, is carried out. When the bag 1 comes to a stop in this stop position VII, the hot plates 23, 23 that have been opened are closed, and, as shown in FIG. 5(a) and FIG. 8, the film sheets 7, 8 of the front and rear surface of the bag 1 are pressure-held in the gas introduction section 6a and the mouth of the bag on both sides, and they are sealed. As a result, the gas is encapsulated in the gas compartment portion 6 of the bag 1, and at the same time the material 33 to be packaged is hermetically enclosed in the bag 1.

Furthermore, in stop position VII, a measuring unit 36 that is shown in FIGS. 6 through 9 and forms part of the gas pressure testing device 35 is further provided (the measuring unit 36 is not illustrated in FIG. 5(a)).

Figure 6:
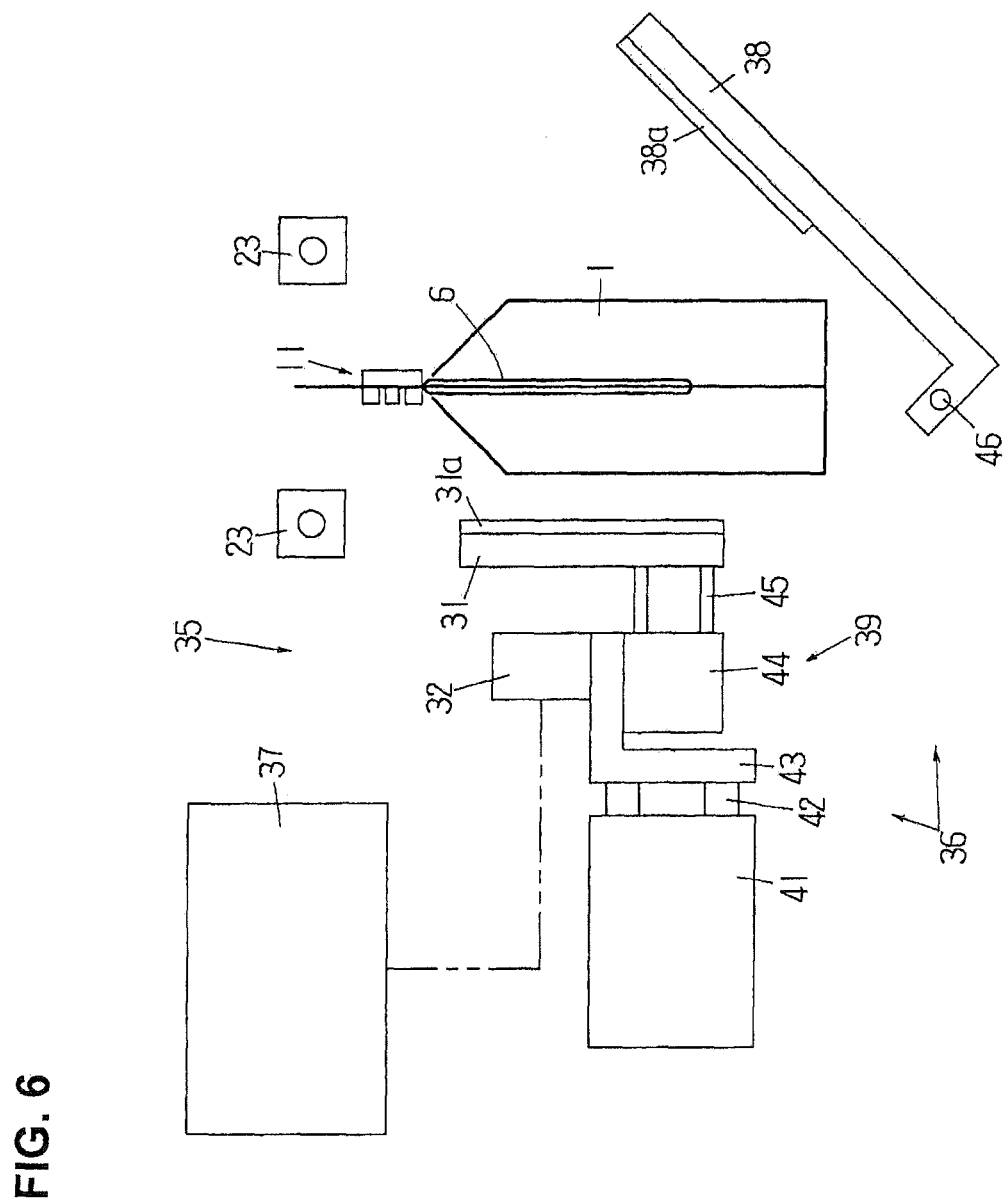
FIG. 6 is a side view illustrating the gas pressure testing device and the gas pressure testing step (prior to the testing) according to the present invention.

The gas pressure testing device 35 is, as seen from FIG. 6, comprised of a measuring unit 36 and a control unit 37.

The measuring unit 36 is made up of a pressing member 31 disposed outside the bag conveying path of the bag 1 equipped with a gas compartment portion, a receiving member 38 disposed inside the bag conveying path. In other words, the pressing member 31 is disposed on one side of the bag and the receiving member 38 is disposed on another side of the bag. The measuring unit 36 further includes a support member 39 supporting the pressing member 31 on the rear side of the pressing member 31, a drive source 41 for reciprocating the support member 39 through a predetermined stroke in a front-to-rear direction, and a distance sensor 32 installed on the support member 39. It should be noted that, as used herein, the term "front-to-rear direction"

refers to the thickness direction of the bag 1 stopped in stop position VII (the direction perpendicular to the surface of the seal portion 2 of the bag 1), and the side proximate to the bag 1 is the front side.

Figure 7:
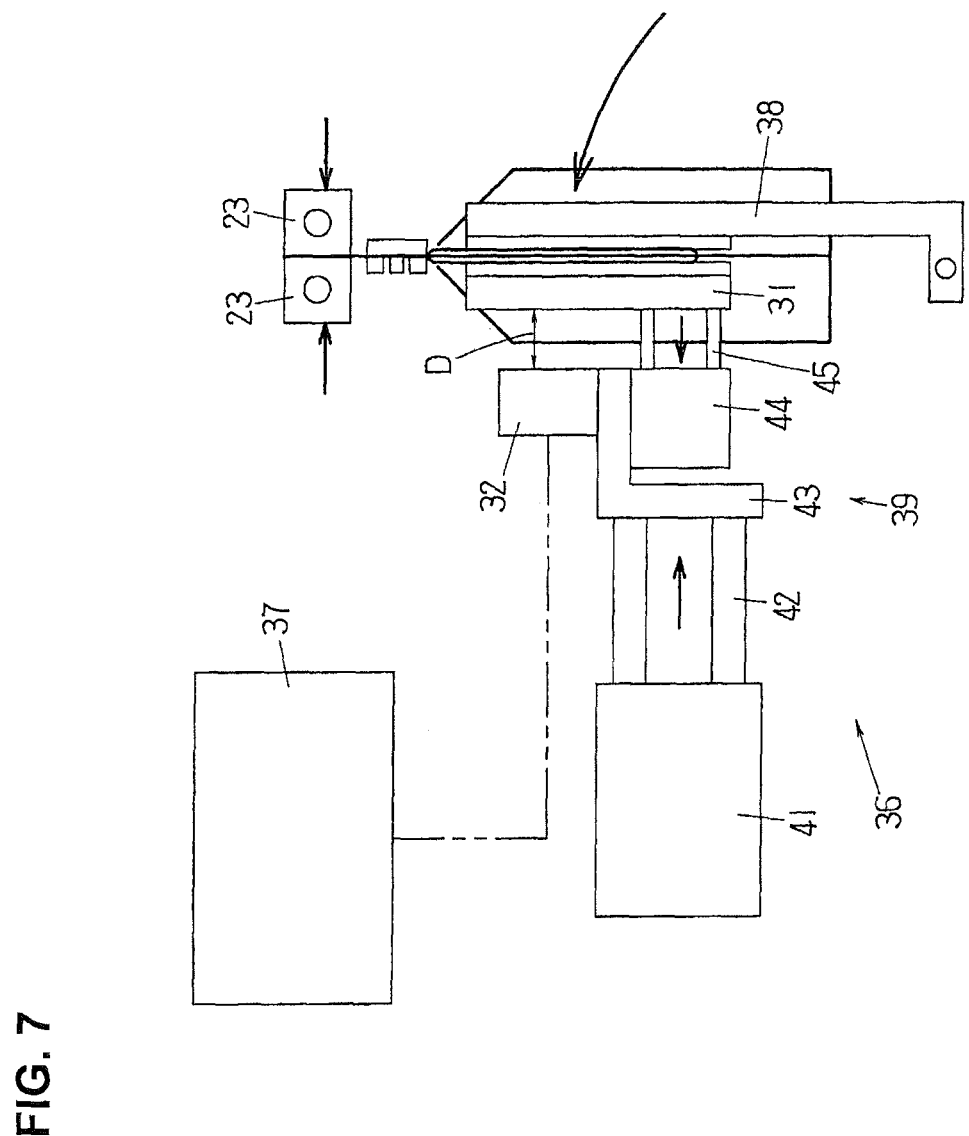
FIG. 7 is likewise a side view illustrating the gas pressure testing device and the gas pressure testing step (during the testing) according to the present invention.

The drive source 41 is a double-acting air cylinder, and it has the support member 39 installed at the distal end of the piston rod 42 and horizontally reciprocates the support member 39 through a predetermined stroke in the front-to-rear direction. FIG. 6 illustrates a state in which the piston rod 42 of the drive source 41 is retracted and the support member 39 stops in the retracted position, and FIG. 7 illustrates a state in which the piston rod 42 extends or has moved forward and the support member 39 stops in the extended or forward-end position.

The support member 39 is made up of a moving member 43 secured to the distal end of the piston rod 42 and a biasing or urging member 44 secured to the moving member 43. The biasing member 44 is a double-acting air cylinder having the pressing member 31 secured to the distal end of its piston rod 45. In the biasing member (air cylinder) 44, compressed air under a predetermined pressure is introduced into its cylinder room (not shown) provided on the opposite side from the piston rod 45, thus biasing or urging the pressing member 31 forward with a constant force at all times. When the piston rod 45 extends under the action of this biasing or urging force and the pressing member 31 is not under load, the pressing member 31 is positioned at the end of its forward stroke (or positioned abutting a stopper). On the other hand, when a rearward load larger than the biasing or urging force is applied to the pressing member 31, the pressing member 31 retreats or is moved backward from the end of the forward stroke (the piston rod 45 is retracted).

On its front side, the pressing member 31 has a rectangular contact member 31a. This contact member 31a is oriented perpendicularly to the thickness direction of the bag 1 stopped in stop position VII (parallel to the seal portion 2 of the bag 1) and it is rectangular in shape having the longer side in the longitudinal direction (the longitudinal length of the contact member is substantially the same as the length of the main section 6c of the gas compartment portion 6).

The receiving member 38 swings, by a drive source, not shown, about a swing axle 46 so as to make at a predetermine timing an up and down arc motion in the vertical plane between the retracted position and the receiving position (or bag-receiving position). FIG. 6 illustrates a state in which the receiving member 38 has been swung downwardly to be in the retracted position, while FIG. 7 illustrates a state in which the receiving member 38 has been swung upwardly and stopped in the receiving position and positioned therein. On its front side, the receiving member 38 has a rectangular contact member 38a that is longer in the longitudinal direction (the longitudinal length of the contact member 38a is substantially the same as the longitudinal length of the main section 6c of the gas compartment portion 6 of the bag). When the receiving member 38 stops in the receiving position shown in FIG. 7, the contact member 38a is oriented perpendicularly to the thickness direction of the bag 1 (or parallel to the seal portion 2 of the bag) stopped in stop position VII.

With the structure described above, prior to the arrival of the bag 1 in stop position VII, the hot plates 23, 23 are, as shown in FIG. 6, open, the support member 39 is in the retracted position, the pressing member 31 is biased forward and positioned at the end of the stroke, and the receiving member 38 is in the lower retracted position.

As discussed previously with reference to FIG. 5(a), when the bag 1 stops in stop position VII, the hot plates 23, 23 that have been opened are closed, and furthermore, as shown in FIG. 7, the drive source (air cylinder) 41 operates such that the support member 39 is moved forward toward the bag for a predetermined stroke and stops in the forward-end position. As the support member 39 is thus moved forward, the pressing member 31 is also moved forward towards the bag. At the same time, the drive source, not shown, is actuated so that the receiving member 38 is operated to swing upwardly, so that the receiving member 38 is stopped in the receiving position on the back side of the bag and positioned in this receiving (or bag-receiving) position.

As a result of the forward movement of the pressing member 31 and the upward swing of the receiving member 38, the seal portion 2 of the bag 1 stopped in stop position VII (with a gas compartment portion 6 inflated as a result of being filled with compressed gas) is sandwiched, as seen from FIG. 7, between the contact member 31a of the pressing member 31 and the contact member 38a of the receiving member 38.

When the pressing member 31 and the receiving member 38 thus sandwich the seal portion 2 (or the gas compartment portion 6) in between, the pressing member 31 and the receiving member 38 receive a reaction force (a load acting in the retracting direction of both pressing member 31 and receiving member 38) from the expanded or inflated seal portion 2 (or the gas compartment portion 6). The receiving member 38 is positioned in its receiving position, and this receiving position of the receiving member 38 remains essentially unchanged despite the reaction force applied thereto when the seal portion 2 (gas compartment portion 6) is sandwiched. On the other hand, however, the pressing member 31, being biased (or urged) forward (or toward the bag 1) with a constant force by the biasing member (air cylinder) 44, retreats (or is moved backward) from the forward stroke end to a position where the biasing force is balanced with the reaction force applied thereto when the seal portion 2 (or the gas compartment portion 6) is sandwiched. In this situation, the higher the pressure of the gas charged in the gas compartment portion 6 and the greater the expansion of the gas compartment portion 6, the greater the magnitude of the distance of retreat or backward movement of the pressing member 31. In other words, there is a correlation between the distance of retreat of the pressing member 31 and the pressure of the gas inside the gas compartment portion 6.

In the present invention, instead of the above-described distance of retreat or backward movement of the pressing member 31, the distance sensor 32 is used to measure the distance D (see FIG. 7) to the pressing member 31 (or the distance between the distance sensor 32 and the pressing member 31). Needless to say, the higher the pressure of the gas in the gas compartment portion 6 and the greater the expansion of the gas compartment portion 6, the smaller the magnitude of the distance D. Thus, there is a correlation between the distance D and the pressure of the gas in the gas compartment portion 6, and this correlation is obtained beforehand based on experiments using actual equipment. If a target value (a desirable range) of the pressure of the gas in the gas compartment portion 6 is set, then the range of the distance D is determined based on the above-described correlation; and the predetermined range (the upper limit and lower limit values) of the distance D that ensures the target pressure value (a desirable range) is set in advance (or preset) in the control unit 37.

When the pressing member 31 and the receiving member 38 sandwich the seal portion 2 (gas compartment portion 6), the distance sensor 32 measures the distance D between the distance sensor 32 and the pressing member 31, and the measurement or distance signal is sent to the control unit 37.

Based on the measurement or distance signal from the distance sensor 32, the control unit 37 determines whether or not the measured distance D is within the preset or predetermined range (or above the lower limit value and below the upper limit value), in other words, whether or not the pressure of the gas in the gas compartment portion 6 is within the preset target value range (or above the lower limit value and below upper limit value).

Subsequently, the bag 1 equipped with a gas compartment portion that has a predetermined (appropriate) interior gas pressure is conveyed to stop position VIII.

Any bag in which the pressure of the charged gas is determined to be outside the preset range based on the result obtained by the control unit 37 can be eliminated in the following steps. In addition, based on this determination result, it is possible to adjust various factors including the pressure of the gas to be discharged from the nozzles 28, 29, the gap L between the discharge outlets 28a, 29a of the nozzles 28, 29, and other injection conditions, so that the pressure of the gas encapsulated in the gas compartment portion 6 is regulated properly.

(8) In stop position VIII (seal cooling and discharge station), a pair of cooling plates 24, 24 that form part of the cooling device are disposed in the vicinity of the bag conveying path of the bag 1 and cool the areas of the bag that are sealed in the previous step by pressure-holding them on both sides as shown in FIG. 5(b). Subsequently, as shown in FIG. 5(c), during the cooling process, the gas blocking gripper 16 and the bag-conveying grippers 11, 12 are opened, and the cooling plates 24, 24 are opened as well, so that, as seen from FIG. 2, the bag 1P (which is a product bag with the material 33 packaged and gas encapsulated) falls down and is discharged from the apparatus through a chute 47. The gas blocking gripper 16 can be opened at the stage when the gas sealing step is completed.

The present invention is described above in detail with reference to FIGS. 1 through 12(c), and the present invention can take other modes as described below:

(1) Although the foregoing description is made for the bag that has the incision 9 at the upper edge of the gas compartment portion 6, the bag can be formed with an opening (a type of gas inlet) instead of the incision 9.

(2) The foregoing description is made for the bag that has a neck section 6b formed in the gas compartment portion 6 with the neck section being smaller in width than the gas compartment portion 6. Nonetheless, the entire gas compartment portion 6 can be made to have the same width for its entire length (depth) as seen in the bag equipped with gas compartment portion described in Japanese Patent No. 4,771,785.

(3) The foregoing description is made for the bag-conveying grippers 11 that clamp the seal portion 2 in which the gas compartment portion 6 is formed, and the bag-conveying grippers 11 clamp the seal portion 2 across the gas compartment portion 6; however, the grippers can be adapted to clamp the outside of the gas compartment portion only as in the same manner as the bag-conveying grippers described in Japanese Patent No. 4,771,785.

(4) The foregoing description is made so that a pair of gas injection nozzles 28, 29 are used in the gas filling step; however, it is also possible to use in the gas filling step the receiving member 27 and the preliminary gas injection nozzle 26 that are used in the preliminary gas injection step.

(5) In the foregoing description, an upper limit value and a lower limit value are set in advance in the control unit 37 as a range of the distance D that ensures the target pressure values (desirable range). It is, however, also possible to configure the upper limit value alone as the range of the distance D if it can be surmised that the pressure of the gas filled in the gas compartment portion 6 does not exceed the upper limit value of the preset target value range. For example, if the pressure of the gas discharged from the nozzles 28, 29 is adjusted to a level substantially equal to the upper limit value of the target pressure values of the gas that the gas compartment portion 6 is filled with, then it can be surmised that the pressure of the gas that the gas compartment portion 6 is filled with does not exceed the upper limit of the target values.

(6) In the foregoing description, the gas pressure testing step is carried out in stop position VII simultaneously with the gas charging step. However, the gas pressure testing step can also be carried out in stop position VI after the gas filling step. In such a case, the gas pressure measuring device 36 is disposed in the vicinity of stop position VI along the bag conveying path. The gas pressure testing step can be carried out at an appropriate moment in time as long as it is done subsequent to the filling of the gas compartment portion 6 with gas (or subsequent to the blocking of the blockage region by the gas blocking gripper).

(7) In the foregoing description, the gas pressure testing device is configured as part of a rotary packaging apparatus. However, it can also be configured as part of a dedicated gas charging apparatus that does not include devices that perform filling of bags with the material to be packaged (e.g., a mouth-opening device and packaged material filling devices).

The invention claimed is:

1. A gas pressure testing device for checking the pressure of gas charged in a gas compartment portion of a bag in which the gas compartment portion is formed integrally therein and extends in a longitudinal direction in a sealed side edge portion of the bag, said gas pressure testing device being comprised of a measuring unit and a control unit, wherein said measuring unit is comprised of:
a pressing member which is disposed on one side of a bag equipped with a gas compartment portion and suspended by being clamped at top portions of two lateral edges of the bag by a pair of grippers and which is moved forward and backward in a thickness direction of the bag to press the gas compartment portion when moved forward,
a receiving member which is disposed on another side of the bag and is positioned in a receiving position on a back side of the gas compartment portion,
a support member which supports the pressing member on a rear side of the pressing member so as to move the pressing member in a forward or rearward direction while urging the pressing member forward,
a drive source which moves the support member forward and rearward through a predetermined stroke, and
a distance sensor which is provided on the rear side of the pressing member, is moved forward and backward together with the support member by the drive source, and measures a distance to the pressing member; and
said distance sensor measures a distance between the distance sensor and the pressing member when the pressing member is moved forward by the support member moved forward by the drive source and sandwiches the gas compartment portion between the pressing member and the receiving member which is positioned in the receiving position; and wherein said control unit determines whether or not a pressure of gas that is filled in the gas compartment portion is within a preset range based on signals from the distance sensor.

2. The gas pressure testing device according to claim 1, wherein said support member is comprised of a moving member coupled to said drive source and an air cylinder installed on the moving member, said distance sensor is provided on the moving member, said pressing member is provided on a piston rod of the air cylinder, and the air cylinder is provided with a cylinder room which is installed on an opposite side from the piston rod and has therein compressed air under a predetermined pressure.

3. The gas pressure testing device according to claim 2, wherein said receiving member is provided so as to be movable, at a predetermined timing, between the receiving position and a retracted position which is away from the bag.

4. The gas pressure testing device according claim 3, wherein said control unit determines whether or not the pressure of gas in the gas compartment portion is within the preset range based on whether or not the distance to the pressing member is within a predetermined range.

5. The gas pressure testing device according to claim 2, wherein said control unit determines whether or not the pressure of gas in the gas compartment portion is within the preset range based on whether or not the distance to the pressing member is within a predetermined range.

6. The gas pressure testing device according to claim 1, wherein said receiving member is provided so as to be movable, at a predetermined timing, between the receiving position and a retracted position which is away from the bag.

7. The gas pressure testing device according claim 6, wherein said control unit determines whether or not the pressure of gas in the gas compartment portion is within the preset range based on whether or not the distance to the pressing member is within a predetermined range.

8. The gas pressure testing device according to claim 1, wherein said control unit determines whether or not the pressure of gas in the gas compartment portion is within the preset range based on whether or not the distance to the pressing member is within a predetermined range.

9. A gas charging apparatus provided with a plurality of pairs of bag-conveying grippers that clamp top portions of two lateral edges of a bag and convey the bag intermittently along a predetermined bag conveying path, the bag being integrally formed therein with a gas compartment portion extending in a longitudinal direction in a side edge seal portion of the bag and having a gas inlet which is formed in a film sheet constituting a gas introduction section of the gas compartment portion and places an exterior of the bag in communication with an interior of the gas compartment portion, and said gas charging apparatus, while conveying the bag intermittently along the bag conveying path, injects gas into the gas compartment portion through the gas inlet and subsequently encapsulates the gas in the gas compartment portion, wherein said gas charging apparatus is provided with the gas pressure testing device for the gas compartment portion of the bag according to any one of claims 1 to 4, and said measuring unit is disposed in the vicinity of a predetermined gripper stop position along the bag conveying path.

10. A rotary packaging apparatus provided with a plurality of pairs of left and right bag-conveying grippers that clamp top portions of two lateral edges of a bag and convey the bag intermittently along a circular bag conveying path, the bag being integrally formed therein with a gas compartment portion extending in the longitudinal direction in a side edge seal portion of the bag and having a gas inlet that is formed in a film sheet constituting a gas introduction section of the gas compartment portion and places an exterior of the bag in communication with an interior of the gas compartment portion, and said rotary packaging apparatus, while conveying the bag intermittently along the bag conveying path, fills material to be packaged in the bag and injects gas into the gas compartment portion through the gas inlet and subsequently encapsulates the gas in the gas compartment portion, wherein said rotary packaging apparatus is provided with the gas pressure testing device for a gas compartment portion according to any one of claims 1 to 4, and said measuring unit is disposed in the vicinity of a predetermined gripper stop position along the bag conveying path.

* * * * *